United States Patent [19]
Jay

[11] 3,739,878
[45] June 19, 1973

[54] GROCERY CART AND CHECKOUT COUNTER COMBINATION

[76] Inventor: Walter M. Jay, 16 Tweed Road, Fox Lake, Ill. 60020

[22] Filed: May 18, 1971

[21] Appl. No.: 144,531

[52] U.S. Cl............................. 186/1 AC, 186/1 A
[51] Int. Cl............................................... E04h 3/04
[58] Field of Search...................... 186/1, 1 A, 1 AC

[56] References Cited
UNITED STATES PATENTS

| | | | |
|---|---|---|---|
| 3,052,319 | 9/1962 | Swanson | 186/1 AC |
| 3,517,773 | 6/1970 | Swanson | 186/1 AC |
| 3,557,907 | 1/1971 | Close | 186/1 AC |
| 3,368,646 | 2/1968 | Cachance | 186/1 AC |

*Primary Examiner*—Harvey C. Hornsby
*Attorney*—Andrew F. Wintercorn

[57] ABSTRACT

In the present cantilever grocery cart and checkout counter combination the entry end of the overhanging counter, which the basket in the upper half of the cart is adapted to overlie in the checkout operation, extends at an acute angle to define a cam surface to guide the cart laterally into the aisle alongside the checkout counter by sliding abutment of correspondingly, angularly spaced upright parts on the cart with the angled end of the counter as the customer pushes or pulls the cart forward, the wheels on the cart being of the usual caster type to swivel as necessary to obtain the initial lateral movement of the cart.

To further facilitate properly servicing all of the carts in the flow of cart traffic past the checkout counter while insuring against oversight in checking out merchandise, the entry end portion of the counter with the acute angled end cam surface in one form is defined by an open horizontal frame permitting the checkout person to see down through the upper basket to the lower basket and be certain to check out any merchandise deposited in the lower level of the cart that might otherwise be eventually hauled away without payment.

5 Claims, 5 Drawing Figures

PATENTED JUN 19 1973 3,739,878
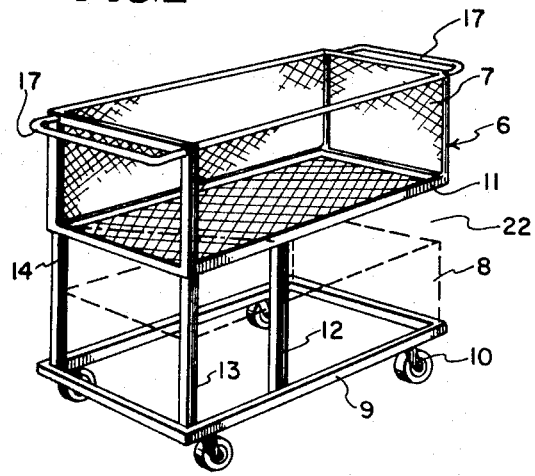
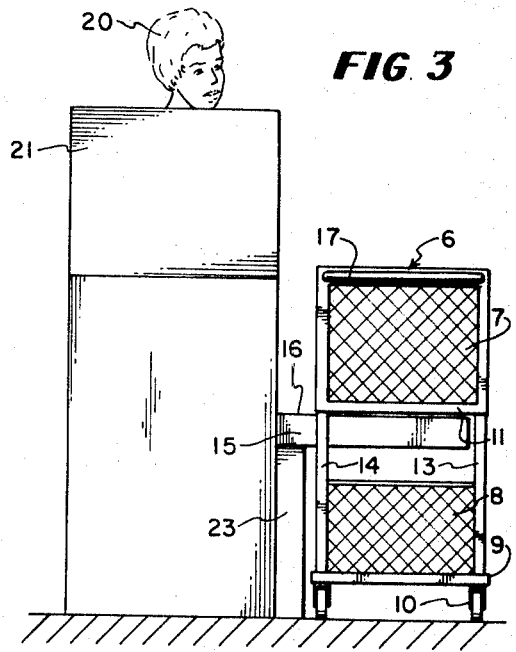
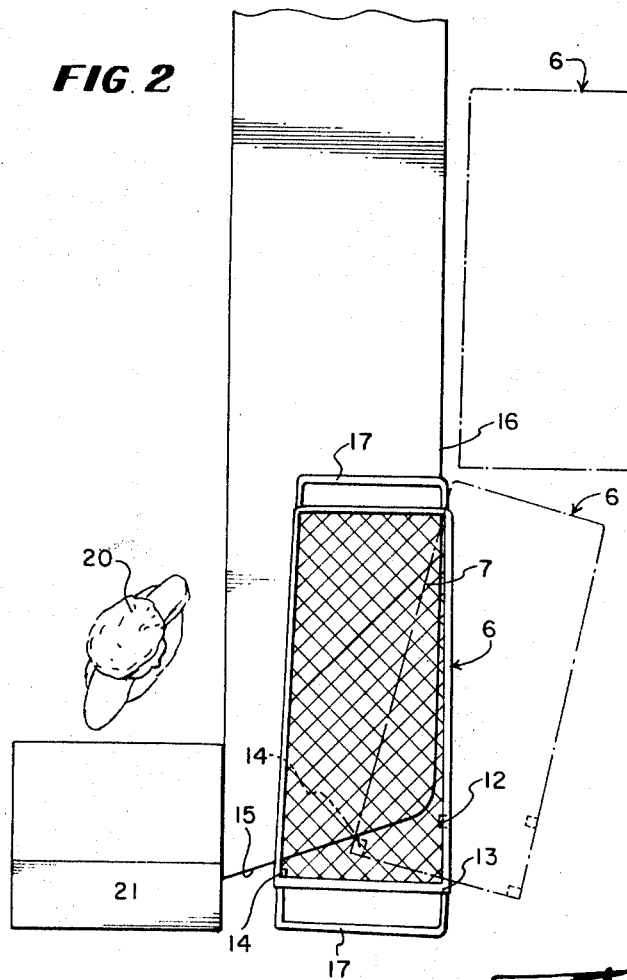
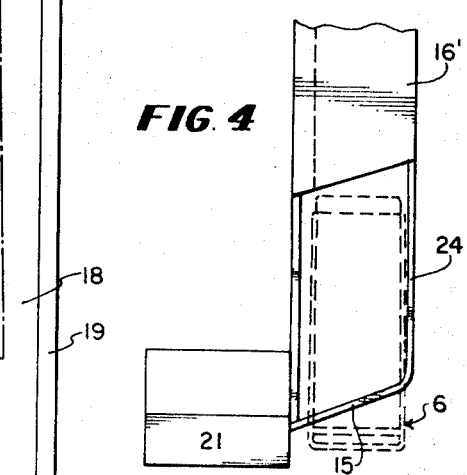
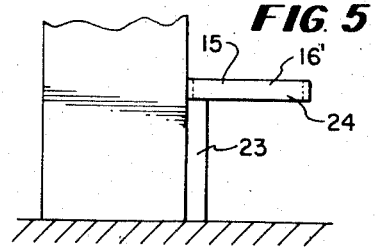
INVENTOR:
Walter M. Jay
Andrew F. Wintercorn
ATTORNEY

GROCERY CART AND CHECKOUT COUNTER COMBINATION

This invention is the subject matter of a disclosure document Ser. No. 000,470, filed Sept. 10, 1969.

This invention relates to an improved cantilever type grocery cart and improved correlated checkout counter combination for use in supermarkets, not only to facilitate the easy orderly flow of cart traffic past the checkout counter, but also greatly reduce the risk of the checkout person overlooking the tabulation of any merchandise that should have been recorded in punching the keys on the cash register.

The invention is illustrated in the accompanying drawing, in which:

FIG. 1 is a perspective view of one of my improved cantilever type grocery carts, showing the open top upper and lower baskets for reception of the merchandise and also the provision of upright posts in the rear end portion of the cart so arranged in relation to the angulation or cam shape of the entry end of the overhanging checkout counter providing a guide cam surface thereon for sliding abutment with the posts on the cart to give the novel cart guiding action illustrated in FIG. 2;

FIG. 2 is a plan view of the grocery cart and checkout counter combination of my invention;

FIG. 3 is a rear view of FIG. 2 to better illustrate the cooperative relationship between the posts on the cart and the end of the counter to obtain the results desired;

FIG. 4 is a plan view of a checkout counter having an open framework in the entry end portion enabling a clear view through this portion of the counter into the lower basket portion of the cart for the purposes intended, and FIG. 5 is a rear view of FIG. 4.

The same reference numerals are applied to corresponding parts throughout these views.

Referring to the drawing, and more particularly FIGS. 1 to 3, there is shown in FIG. 1 at 6, one of my improved cantilever type grocery carts having open top generally rectangular upper and lower baskets 7 and 8 of see-through wire mesh construction on the bottoms thereof as well as the side and end walls. The cart's generally rectangular bottom frame 9 has swivelled thereon on vertical axes, four caster wheels 10 at the four corners. The generally rectangular bottom frame 11 for the upper basket 7 is rigidly supported on the other bottom frame 9 in a predetermined vertically spaced relation thereto on three vertical posts 12, 13 and 14 and these may be of square cross-section as shown or round cross-section, as desired, the most important point being that the post 12 be spaced forwardly a predetermined distance in relation to the corner post 13 and the other corner post 14, as best appears in FIGS. 1 and 2, the point being that posts 12 and 14 will both have slidable guiding engagement with the angled end cam surface 15 at the entry end of the overhanging checkout counter 16 to cause sidewise movement of the cart into aisle 18, when the customer, who has hold of an end handle 17, is pushing or pulling forwardly on the cart, and starts moving the cart toward the aisle 18 defined between the side front of the checkout counter 16 and an parallel adjacent partition 19. A checkout person is indicated at 20, standing behind the checkout counter 16 next to the cash register 21, generally located adjacent the entry end of the checkout counter in super-markets.

In operation, it is a simple matter for the checkout person 20, with or without the assistance of the customer and other personnel to remove merchandise from the upper basket 7 as the various items are tabulated by depressing the appropriate keys on the cash register 21. The upper basket 7, in this operation, overlies the entry end portion of the checkout counter 16, as shown in FIG. 2 and also FIG. 3. There is adequate space, as indicated at 22 in FIG. 1, between the bottom of the upper basket 7 and open top of the lower basket 8 to accommodate the overhanging checkout counter top 16 therebetween. A suitable support for the counter top 16 is shown at 23 in FIG. 3 leaving adequate space to the right of it toward the aisle 18 to accommodate the lower basket 8 under the counter top during the checking out operation. Of course, after all of the merchandise is removed from the upper basket 7 and properly tabulated, the checkout person 20 will look at the cart 6 in the aisle 18 to notice whether any other merchandise was deposited in the lower basket 8 and have those items placed on the counter 16 and tabulated on the cash register 21 before the cart is moved forwardly out of the aisle 18 away from the checkout counter. However, it is realized that, particularly during rush hours, a harried checkout person might easily overlook some items in a lower basket 8 with the counter constructed as shown at 16 in FIG. 2, so the checkout counter like that shown at 16' in FIGS. 4 and 5 is disclosed having a substantial portion of the entry end portion 24 of open frame construction, the entry end portion 24 of open frame construction being approximately of the same length as the cart 6 indicated in dotted lines in FIG. 4, this form, however, still containing the desirable angulation of the end guide or cam surface 15, similarly as in FIGS. 2 and 3 with a view:

1. To giving the checkout person 20 an unobstructed view downwardly through the upper half of the cart to any items of merchandise in the lower basket 8 while the cart is still in the initial entry end of the checkout counter, and
2. Still retaining the sidewise guiding feature at 15 to expedite movement of carts through the aisle 18 past the checkout counter.

It is believed the foregoing description conveys a good understanding of the objects and advantages of my invention. While a preferred embodiment of the invention has been illustrated and described, this is only for the purpose of illustration, and it is to be understood that various modifications in structure will occur to a person skilled in this art.

I claim:

1. In combination, a supermarket checkout counter comrpising an overhanging horizontal counter top supported in a predetermined vertically spaced parallel relation to a floor therebeneath so as to underlie the upper basket of a grocery cart, and a grocery cart of the cantilever type movable on the floor having an upper open top basket supported on a portable carrier frame to overlie the counter top when the cart is positioned with its carrier frame beneath said counter top, caster wheels swiveled on vertical axes and resting on the floor under the carrier frame permitting induced lateral movement of the cart when it is pushed or pulled forwardly, the entry end of the counter top having a guide or cam surface extending at an acute angle in relation to the longitudinal center line of the cart when the same is disposed initially longitudinally relative to and with its upper basket overlapping the entry end of the counter top, and acute angled guide means on said cart slidably abutting the angularly extending end guide or cam surface of said counter whereby to guide the cart laterally into an aisle parallel to and alongside the checkout counter when the cart is pushed or pulled forwardly relative to said checkout counter from its initial position.

2. The combination as set forth in claim 1, wherein the cart includes a lower open top basket supported on the carrier frame in a predetermined vertically spaced relation to and below the upper basket allowing the overhanging counter to come between the upper and lower baskets, the upper basket being of open mesh wire construction, permitting a view downwardly through the upper basket into the lower basket, and the entry end portion of the counter top on the end of which the acute angled guide or cam surface is provided being of open construction for a substantial length in relation to the length of the upper and lower baskets of said cart.

3. The combination as set forth in claim 1, wherein the guide means on the cart slidably engageable with the angled end guide or cam surface of the counter comprises laterally spaced substantially vertical posts rigid with the cart and located on a horizontal line at an acute angle relative to the longitudinal center line of the cart.

4. The combination as set forth in claim 1, wherein the guide means on the cart slidably engageable with the angled end guide or cam surface of the counter comprises laterally spaced substantially vertical supporting posts for one of the baskets which are located on a horizontal line at an acute angle relative to the longitudinal center line of the cart.

5. The combination as set forth in claim 1, including a lower basket in the cart and wherein the angled end guide or cam surface on the counter is at a level between the top and bottom baskets, and the guide means on the cart comprises laterally spaced substantially vertical supporting posts for the upper basket which are located on a horizontal line at an acute angle relative to the longitudinal center line of the cart.

* * * * *